United States Patent Office 3,344,173
Patented Sept. 26, 1967

3,344,173
P-(THIA-n-DODECYL) BENZENESULFONATES
Dietrich Lang, Sherborn, and Louis Long, Jr., Concord, Mass., assignors to the United States of America as represented by the Secretary of the Army
No Drawing. Filed Nov. 3, 1964, Ser. No. 408,703
7 Claims. (Cl. 260—505)

The invention described herein, if patented, may be manufactured and used by or for the Government for governmental purposes without the payment to us of any royalty thereon.

This invention relates to novel straight-chain alkylarylsulfonate compounds having a sulfur atom in the alkyl chain, to a novel process for the synthesis of these compounds, and to novel intermediate compounds ($\omega$-chloroalkyl)benzenesulfonyl chlorides and sodium ($\omega$-chloroalkyl)benzenesulfonates.

The novel surface active compounds of this invention, termed p-(thia-n-dodecyl)benzenesulfonates, have the following formula:

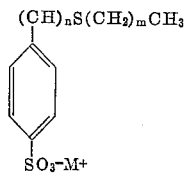

wherein M is a cation, $n$ is an integer from 1 to 10, $m$ is an integer from 0 to 9, with the sum of $n+m$ equal to 10. While M may be any cation, because these compounds are useful as surfactants, it is preferred that the cation be one which will cause the compound to be readily soluble in water such as members of the class consisting of alkali metals, alkaline earth metals, ammonium and alkanolamines, e.g., sodium, potassium, magnesium and mono-, di- and tri-ethanolamine.

The following novel process, used to synthesize those p-(thia-n-dodecyl)benzenesulfonates in which the thia group is in the third through the eleventh position in the side chain, is carried out by reacting the particular ($\omega$-chloroalkyl)benzene with chlorosulfonic acid to form the corresponding novel intermediate compound, ($\omega$-chloroalkyl)benzenesulfonyl chloride, then hydrolyzing the intermediate compound to form the sulfonate, and reacting the latter with a suitable mercaptide to form the desired (thia-n-dodecyl)benzenesulfonate. The reaction proceeds according to the equation:

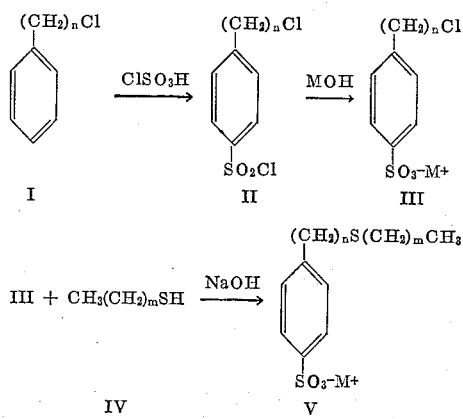

wherein $n$ is an integer from 2 to 10, $m$ is an integer from 0 to 8, the sum of $n+m$ being 10 and M is a cation.

p-(2-Thia-n-dodecyl)benzenesulfonate was prepared by reaction of sodium $\alpha$-chloro-p-toluene sulfonate with sodium n-decyl mercaptide to form p-(2-thia-n-dodecyl) benzenesulfonate.

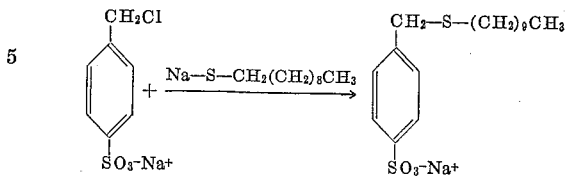

p-(1-Thia-n-dodecyl)benzenesulfonate was prepared by chlorosulfonation of phenyl n-undecyl sulfide followed by alkaline hydrolysis to form sodium p-(1-thia-n-dodecyl) benzenesulfonate.

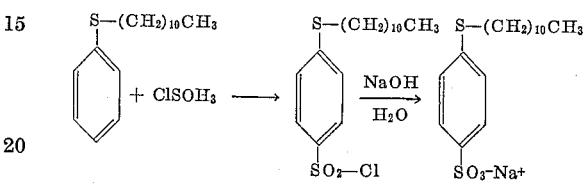

The preparation of the novel surfactants and novel intermediate compounds will be described in detail in the examples which follow.

Example I

*Sodium p-(1 - thia-n-dodecyl)benzenesulfonate.*—Sodium (11.5 g., 0.50 mole) was dissolved in 250 cc. absolute ethanol and 55 g. thiophenol (0.50 mole) added. Under external cooling, 95 g. n-undecyl chloride (0.50 mole) was added and then the reaction mixture boiled under reflux for 3.5 hours. The precipitated sodium chloride was filtered, the solvent evaporated, and the residue dissolved in a mixture of petroleum ether and benzene, from which the phenyl n-undecyl sulfide crystallized on cooling. Yield 102 g. (0.39 mole, 77%), M.P. 31–33°.

A solution of 20 g. (0.076 mole) of phenyl n-undecyl sulfide in 10 cc. of chloroform was dropped during 1 hour into 30 cc. (0.45 mole) of chlorosulfonic acid with stirring at 25°. The reaction mixture was then poured on ice and the organic material extracted with ether. The ether solution was washed with water, sodium bicarbonate solution, again with water, and dried. Evaporation of the solvent yielded 18 g. (0.050 mole, 65%) of crude p-(1-thia-n-dodecyl)-benzenesulfonyl chloride. The infrared spectrum showed the typical absorption bands for the sulfonyl chloride group of 1175 and 1370 cm.$^{-1}$. In 150 cc. of 60% ethanol, 4.0 g. (0.10 mole) of sodium hydroxide and 18 g. (0.050 mole) of p-(1-thia-n-dodecyl)-benzenesulfonyl chloride were dissolved, and the mixture was stirred for several hours at room temperature. On cooling the solution in an ice-bath, sodium p-(1-thia-n-dodecyl)benzenesulfonate crystallized in colorless leaflets. After three recrystallizations from 50% ethanol, 12 g. (0.033 mole, 65%) was obtained. IR-spectrum shows the characteristic bands for the sulfonate group at 1050 and 1180 cm.$^{-1}$ and the typical pattern for a 1,4-disubstituted benzene from 1800 and 2000 cm.$^{-1}$. See Table I for NMR spectrum of this compound and the compounds of the succeeding examples.

*Analysis.*—$C_{17}H_{27}O_3S_2Na$ (366.53): Calc: C, 55.71; H, 7.43; S, 17.50. Found: C, 55.91; H, 7.46; S, 17.61.

Example II

*Sodium p-(2 - thia-n-dodecyl)benzenesulfonate.*—Sodium p-toluenesulfonate (68 g., 0.35 mole) was placed in a 500 cc. four-necked flask provided with a mechanical stirrer, a thermometer and a gas-inlet and -outlet. The flask was placed in an oil-bath at 120°, and with stirring of the dry salt chlorine was passed in. The internal temperature rose to 145°. After 75 minutes the reactant had gained 11 g. The crude reaction product was twice recrystallized from 90% ethanol. The analysis as well as the NMR spectrum indicated that this product is a mixture of mono-and dichlorinated toluenesulfonate. Its NMR spectrum in deuterium oxide (TMS as an external standard) showed besides the signals for the phenyl protons around τ2.4 and the singlet for the benzyl protons at τ5.37 another singlet at τ3.04 due to the benzal proton. From the intensities of these signals the proportion of the compounds was calculated to be about 60% α-monochloro- and 40% α-dichlorotoluenesulfonate.

To a solution of 26 g. of this mixture (about 0.1 mole) and 6.0 g. (0.15 mole) of sodium hydroxide 400 cc. of 40% ethanol, and 26 g. (0.15 mole) of n-decanethiol were added, and the reaction mixture was boiled under reflux for 2 hours. After neutralization with hydrochloric acid the solution was cooled and the precipitated colorless leaflets of sodium p-(2-thia-n-dodecyl)benzenesulfonate recrystallized three times from 50% ethanol. Yield 18 g. (0.049 mole, approx. 50%).

Analysis.—$C_{17}H_{27}O_3S_2Na$ (366.53): Calc: C, 55.71; H, 7.43; S, 17.50. Found: C, 55.76; H, 7.47; S, 17.38.

Example III

Sodium p - (3 - thia-n-dodecyl)benzenesulfonate.—(2-chloroethyl)benzene (Eastman Kodak) (28 g., 0.20 mole) was added dropwise during 1.5 hours to 110 g. (0.95 mole) chlorosulfonic acid with efficient stirring and external cooling by a water-bath at 20°. The reaction mixture was stirred for another hour and then poured onto ca. 400 g. of ice. The water layer was decanted and the semi-solid product triturated three times with ice water. The crude p-(2-chloroethyl)benzenesulfonyl chloride was recrystallized twice from a mixture of petroleum ether and ether (3:1). Yield 27 g. (0.113 mole, 57%) M.P. 53.5–55°.

Analysis.—$C_8H_8Cl_2O_2S$ (239.13): Calc: C, 40.18; H, 3.37; Cl, 29.65; S, 13.41. Found: C, 40.32; H, 3.50; Cl, 29.58; S, 13.30.

The infrared spectrum of this product (potassium bromide) exhibits strong bands at 1180 and 1380 cm.$^{-1}$ due to the sulfonyl chloride group and weak bands at 1800 and 1925 cm.$^{-1}$ that indicate a 1,4-disubstituted benzene.

To a solution of 1.7 g. (0.042 mole) of sodium hydroxide in 100 cc. water was added 5.0 g. (0.021 mole) of p-(2-chloroethyl) benzenesulfonyl chloride, and the heterogeneous reaction mixture was stirred vigorously until it became homogeneous. The solution was neutralized with hydrochloric acid and evaporated to dryness. Recrystallization of the residue from ethanol yielded 4.2 g. (0.0173 mole, 82%) of sodium p-(2-chloroethyl) benzenesulfonate in the form of colorless leaflets.

To a solution of 3.0 g. (0.012 mole) of sodium p-(2-chloroethyl) benzenesulfonate and 0.50 g. (0.012 mole) of sodium hydroxide in 35 cc. of 50% ethanol was added 2.0 g. (0.012 mole) of n-nonyl mercaptan and this mixture boiled for three hours under reflux. On cooling the solution, colorless leaflets of sodium p-(3-thia-n-dodecyl) benzenesulfonate precipitated. Recrystallization from water afforded 3.0 g. (0.0082 mole, 65%) of the pure product.

Analysis.—$C_{17}H_{27}O_3S_2Na$: Calc: C, 55.71; H, 7.43; S, 17.50. Found: C, 55.48; H, 7.45; S, 17.43.

Example IV

Sodium p-(4-thia-n-dodecyl) benzenesulfonate.—This compound and the following sodium p-(thia-n-dodecyl) benzenesulfonates were prepared essentially in the same manner as described for the synthesis of the compound of the preceding example. However, the intermediate p-(ω-chloroalkyl) benzenesulfonyl chlorides remained liquid in all cases and were therefore separated from the hydrolyzed chlorosulfonation mixture by extraction with ether.

Chlorosulfonation of (3-chloropropyl) benzene at 10° yielded the corresponding sulfonyl chloride (B.P. 146–149°/0.5 mm.) in 75% yield. Reaction of sodium (3-chloropropyl) benzenesulfonate with sodium n-octyl mercaptide gave sodium p-(4-thia-n-dodecyl) benzenesulfonate as colorless leaflets in 46% yield after recrystallization from water.

Analysis.—$C_{17}H_{27}O_3S_2Na$ (366.53): Calc.: C, 55.71; H, 7.43; S, 17.50. Found: C, 55.83; H, 7.29; S, 17.55.

Example V

Sodium p-(5-thia - n - dodecyl)benzenesulfonate. — (4-chlorobutyl)benzene was prepared by reaction of 3-phenylpropylmagnesium chloride with formaldehyde and chlorination of the resulting alcohol with thionyl chloride. Chlorosulfonation at 0° and subsequent hydrolysis with sodium hydroxide yielded sodium p-(4-chlorobutyl) benzenesulfonate in 55% yield after recrystallization from 70% ethanol. Reaction of sodium p-(4-chlorobutyl)benzenesulfonate with sodium n-heptyl mercaptide afforded sodium p-(5-thia-n-dodecyl)benzenesulfonate in the form of colorless leaflets in 29% yield after two recrystallizations from 50% ethanol.

Analysis.—$C_{17}H_{27}O_3S_2Na$ (366.53): Calc: C, 55.71; H, 7.43; S, 17.50. Found: C, 55.72; H, 7.48; S, 17.59.

Example VI

Sodium p-(6 - thia-n-dodecyl)benzenesulfonate.—Sodium p-(5-chloropentyl)benzenesulfonate was prepared in 32% yield by chlorosulfonation of (5-chloropentyl)benzene at 0° and subsequent hydrolysis with sodium hydroxide in 50% ethanol. By reaction of sodium p-(5-chloropentyl)benzenesulfonate with sodium n-hexyl mercaptide, sodium p-(6-thia-n-dodecyl)benzenesulfonate was obtained as colorless leaflets in 31% yield after the crude product had been recrystallized twice from 40% ethanol.

Analysis.—$C_{17}H_{27}O_3S_2Na$ (366.53): Calc: C, 55.71; H, 7.43; S, 17.50. Found: C, 55.64; H, 7.33; S, 17.23.

Example VII

Sodium p-(7 - thia-n-dodecyl)benzenesulfonate.—Chlorosulfonation of (6-chlorohexyl)benzene at 25° and hydrolysis yielded sodium p-(6-chlorohexyl)benzenesulfonate in 30% yield. By reaction of the latter with sodium n-pentyl mercaptide, sodium p-(7-thia-n-dodecyl)benzenesulfonate was obtained in 34% yield in the form of colorless leaflets after three recrystallizations from 50% ethanol.

Analysis.—$C_{17}H_{27}O_3S_2Na$ (366.53): Calc: C, 55.71; H, 7.43; S, 17.50. Found: C, 55.62; H, 7.27; S, 17.69.

Example VIII

Sodium p-(10 - thia-n-dodecyl) benzenesulfonate. — 9-phenylnonanol was prepared by an extension of the method of Conant and Kirner from 6-phenylhexylmagnesium chloride and 3-chloropropoxymagnesium bromide in 46% yield (B.P. 151–155°/mm.). The alcohol was chlorinated with thionyl chloride and the resulting chloride (B.P. 137–140°/0.5 mm.) converted to sodium p-(9-chlorononyl) benzenesulfonate in the usual manner in 20% yield. Reaction of the latter compound with sodium ethyl mercaptide gave sodium p- (10-thia-n-dodecyl) benzenesulfonate as colorless leaflets in 30% yield after two recrystallizations from 40% ethanol.

Analysis.—$C_{17}H_{27}O_3S_2Na$ (366.53): Calc: C, 55.71; H, 7.43; S, 17.50. Found: C, 55.73; H, 7.48; S, 17.48.

Example IX

Sodium p-(11-thia-n-dodecyl) benzenesulfonate.—Sodium p-(10-chlorodecyl) benzenesulfonate was obtained in 13% yield by chlorosulfonation of (10-chlorodecyl) benzene and 0° and subsequent hydrolysis with sodium hydroxide in 50% ethanol. Reaction of the p-(10-chlorodecyl) benzenesulfonate with sodium methyl mercaptide afforded a 32% yield of sodium p-(11-thia-n-dodecyl) benzenesulfonate that had been recrystallized three times from 50% ethanol.

Analysis.—$C_{17}H_{27}O_3S_2Na$ (366.53): Calc: C, 55.71; H, 7.43; S, 17.50. Found: C, 55.89; H, 7.35; S, 17.29.

TABLE I.—NMR SPECTRA OF SODIUM p-(THIA-n-DODECYL)BENZENESULFONATES

| Compound | Aromatic H | | —CH₂S— and PhCH₂— | —CH₂— | —CH₃ | Intensities |
|---|---|---|---|---|---|---|
| 1-thia- | 2.40 | 2.86 | 7.2 | 8.73 | 9.2 | 2:2:2:18:3 |
| 2-thia- | 2.30 | 2.75 | 7.6 \| 6.40 | 8.68 | 9.08 | 2:2:2:2:16:3 |
| 3-thia- | 2.30 | 2.86 | 7.3 | 8.65 | 9.05 | 2:2:6:14:3 |
| 4-thia- | 2.29 | 2.86 | 7.5 | 8.66 | 9.05 | 2:2:6:14:3 |
| 5-thia- | 2.25 | 2.83 | 7.5 | 8.6 | 9.00 | 2:2:6:14:3 |
| 6-thia- | 2.27 | 2.84 | 7.5 | 8.54 | 9.02 | 2:2:6:14:3 |
| 7-thia- | 2.26 | 2.84 | 7.5 | 8.53 | 9.00 | 2:2:6:14:3 |
| 10-thia- | 2.33 | 2.90 | 7.5 | 8.71 | 8.9 | 2:2:6:14:3 |
| 11-thia- | 2.34 | 2.92 | 7.5 | 8.65 | 7.96 | 2:2:4:16:3 |

The NMR spectra were recorded on a Varian 60 mc. spectrometer at 60°. The samples were dissolved in deuterated water with sodium 2,2-dimethyl-2-silapentane-5-sulfonate (DDS) as internal standard ($\tau=10.00$ for the trimethylsilyl protons).

A general feature of all spectra of Table I is an $A_2B_2$ pattern with two doublets of equal intensity for the phenyl protons. The coupling constants ($J=8$ c.p.s.) are the same in all cases. The $A_2B_2$ pattern found for the phenyl protons proves that the substituents in the benzene ring are in the para positions. In most of the spectra the peaks for the benzyl protons and the protons of the methylene groups that are next to the sulfur are not separated but rather consist of one broad signal. The observed intensities are in all cases identical with the calculated values.

The novel (thia-n-dodecyl)benzenesulfonates of this invention, as previously noted, are surface active agents. Laboratory tests indicate that these compounds are excellent detergents, comparable to n-dodecylbenzene-sulfonate in their detersive properties.

Certain of these novel compounds possess a further advantageous property in that they are rapidly and completely biodegradeable. Biodegradeability in this context refers to the ability of a surfactant to be broken down in waste water by biological agents, e.g., bacteria, within a reasonable time. Synthetic detergents presently used are extremely stable and show little or no tendency to be degraded after use.

Because of their stability, detergents are causing problems in connection with contamination with water supplies and adversely affect sewerage treatment processes because of their foaming and suspending action. Good detergents which will break down quickly (e.g., two weeks) into non-surface active and harmless components are as a consequence eagerly sought for. The following compounds:

p-(1-thia-n-dodecyl)benzenesulfonate
p-(2-thia-n-dodecyl)benzenesulfonate
p-(3-thia-n-dodecyl)benzenesulfonate
p-(4-thia-n-dodecyl)benzenesulfonate
p-(5-thia-n-dodecyl)benzenesulfonate
p-(6-thia-n-dodecyl)benzenesulfonate have been found to be completely biodegradeable in river water at 25° C. within two weeks. The test method employed in determining the biodegradeability of the foregoing compounds was the River-Die-Away-Test (methylene blue method) described in the Journal of the American Water Works Association, vol. 50 (October 1958).

We claim:
1. A compound of the formula:

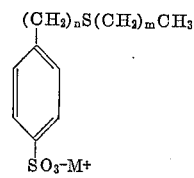

$$(CH_2)_nS(CH_2)_mCH_3$$
$$SO_3^-M^+$$

wherein M is a cation selected from the group consisting of alkali metals, alkaline earth metals, ammonium, and alkanolamines; $n$ is an integer from 1 to 10, $m$ is an integer from 0 to 9, with the sum of $n$ and $m$ being 10.

2. A compound according to claim 1 wherein M is sodium.

3. Sodium salt of p-(2-thia-n-dodecyl)benzenesulfonic acid.

4. Sodium salt of p-(3-thia-n-dodecyl)benzenesulfonic acid.

5. Sodium salt of p-(4-thia-n-dodecyl)benzenesulfonic acid.

6. Sodium salt of p-(5-thia-n-dodecyl)benzenesulfonic acid.

References Cited

UNITED STATES PATENTS

| | | | |
|---|---|---|---|
| 1,025,652 | 5/1912 | Schmidt | 260—505 |
| 2,678,947 | 5/1954 | Jones | 260—505 |
| 2,821,549 | 1/1958 | Mock | 260—505 |
| 3,079,430 | 2/1963 | Goodshaw et al. | 260—505 |
| 3,117,131 | 1/1964 | Breuer et al. | 260—543 |
| 3,125,604 | 3/1964 | Robbins | 260—505 |

FOREIGN PATENTS 614,311   6/1935   Germany.

OTHER REFERENCES

Brewster: Organic Chemistry, 1953 (New York), pp. 300–1.

LORRAINE A. WEINBERGER, *Primary Examiner.*

M. WEBSTER, *Assistant Examiner.*